(12) United States Patent
Li

(10) Patent No.: US 12,524,985 B2
(45) Date of Patent: Jan. 13, 2026

(54) FACE RECOGNITION-BASED VIDEO RECOMMENDATION METHOD AND APPARATUS, AND TELEVISION

(71) Applicant: SHENZHEN TCL DIGITAL TECHNOLOGY LTD., Shenzhen (CN)

(72) Inventor: Rongkun Li, Shenzhen (CN)

(73) Assignee: SHENZHEN TCL DIGITAL TECHNOLOGY LTD., Guangdong (CN)

(*) Notice: Subject to any disclaimer, the term of this patent is extended or adjusted under 35 U.S.C. 154(b) by 0 days.

(21) Appl. No.: 17/758,186

(22) PCT Filed: Aug. 25, 2020

(86) PCT No.: PCT/CN2020/110999
§ 371 (c)(1),
(2) Date: Jun. 29, 2022

(87) PCT Pub. No.: WO2021/135285
PCT Pub. Date: Jul. 8, 2021

(65) Prior Publication Data
US 2022/0374469 A1  Nov. 24, 2022

(30) Foreign Application Priority Data
Dec. 30, 2019 (CN) .......................... 201911391967.6

(51) Int. Cl.
*G06V 10/74* (2022.01)
*G06F 16/735* (2019.01)
(Continued)

(52) U.S. Cl.
CPC ............ *G06V 10/74* (2022.01); *G06F 16/735* (2019.01); *G06V 40/161* (2022.01);
(Continued)

(58) Field of Classification Search
CPC .... G06V 10/74; G06V 40/161; G06V 40/168; G06V 40/172; G06F 16/735; G06F 16/783; H04N 21/251; H04N 21/466
See application file for complete search history.

(56) References Cited

U.S. PATENT DOCUMENTS

2007/0258656 A1  11/2007 Aarabi
2009/0088978 A1* 4/2009 Ishikawa .......... G08G 1/096725
701/514

(Continued)

FOREIGN PATENT DOCUMENTS

CN  103618918 A  3/2014
CN  104363474 A  2/2015
(Continued)

OTHER PUBLICATIONS

International Search Report in International application No. PCT/CN2020/110999, mailed on Dec. 3, 2020.
(Continued)

*Primary Examiner* — Kunal Langhnoja
(74) *Attorney, Agent, or Firm* — PV IP PC; Wei Te Chung

(57) ABSTRACT

Disclosed are a face recognition-based video recommendation method and an apparatus, and a television. The method includes: acquiring a face image, the face image comprising a face of at least one user (S1); acquiring, according to a face recognition algorithm, a face feature set of the at least one user from the face image (S2); comparing the face feature set with face feature sets in an archive (S3); and if the face feature set of the at least one user matches the face feature sets in the archive, displaying a first video recommendation set, and if each face feature set does not match the face feature sets in the archive, display a second video recommendation set (S4). Using the method to recommend videos to users reduces operation steps of the users choosing to watch videos and provides convenience for the users to use.

13 Claims, 2 Drawing Sheets

(51) Int. Cl.
*G06V 40/16* (2022.01)
*H04N 21/25* (2011.01)
*H04N 21/466* (2011.01)

(52) U.S. Cl.
CPC .......... *G06V 40/168* (2022.01); *G06V 40/172* (2022.01); *H04N 21/251* (2013.01); *H04N 21/466* (2013.01)

(56) References Cited

U.S. PATENT DOCUMENTS

| | | | |
|---|---|---|---|
| 2016/0337696 A1* | 11/2016 | Lee | H04N 21/25875 |
| 2017/0155955 A1 | 6/2017 | Liu et al. | |
| 2017/0188103 A1 | 6/2017 | Pan | |
| 2017/0238860 A1* | 8/2017 | el Kaliouby | G16H 50/30 |

FOREIGN PATENT DOCUMENTS

| | | |
|---|---|---|
| CN | 105263052 A | 1/2016 |
| CN | 105868259 A | 8/2016 |
| JP | 2005509966 A | 4/2005 |
| JP | 2006324809 A | 11/2006 |
| JP | 2006526817 A | 11/2006 |
| JP | 2013109537 A | 6/2013 |

OTHER PUBLICATIONS

Written Opinion of the International Search Authority in international application No. PCT/CN2020/110999, mailed on Dec. 3, 2020.
European Search Report in European application No. 20908558.8, mailed on Dec. 12, 2023.
Japanese Office Action issued in corresponding Japanese Patent Application 特願2022-537838 dated on Oct. 22, 2024, pp. 1-4.

\* cited by examiner

FACE RECOGNITION-BASED VIDEO RECOMMENDATION METHOD AND APPARATUS, AND TELEVISION

CROSS-REFERENCE TO RELATED APPLICATION

This application is a US national phase application based upon an International Application No. PCT/CN2020/110999, filed on Aug. 25, 2020, which claims priority to Chinese Patent Application No. 201911391967.6, entitled "FACE RECOGNITION-BASED VIDEO RECOMMENDATION METHOD AND APPARATUS, AND TELEVISION", filed on Dec. 30, 2019, the disclosure of which is incorporated herein by reference in its entirety.

FIELD OF DISCLOSURE

The present disclosure relates to a field of smart television technology, and more specifically, to a face recognition-based video recommendation method and an apparatus, a television, and a storage medium.

BACKGROUND

With continuous progress of science, people's living standards are constantly improving, and more and more attention are paid to life experiences. Everyone has their own hobbies and interests, and everyone's favorite videos are different. At present, when television recommends videos for users, users need to log in their accounts on the television before they get recommended contents, which is a complicated operation process and not convenient for users.

Therefore, the existing technology needs to be improved.

SUMMARY

A technical problem to be solved by the present disclosure is to provide a face recognition-based video recommendation method and an apparatus, a television, and a storage medium, so as to reduce operation steps of users choosing to watch videos and to provide convenience for users to use.

In a first aspect, an embodiment of the present disclosure provides a face recognition-based video recommendation method, the method includes:

acquiring a face image, the face image including a face of at least one user;

acquiring a face feature set of the at least one user from the face image according to a face recognition algorithm;

comparing the face feature set with face feature sets in an archive;

displaying a first video recommendation set if the face feature set of the at least one user matches the face feature sets in the archive, and displaying a second video recommendation set if each face feature set does not match the face feature sets in the archive.

In one embodiment, before the step of acquiring the face image, the method further includes:

establishing the archive in advance.

In one embodiment, the step of establishing the archive in advance further includes:

acquiring face image of users;

obtaining face feature sets of the users from the face images of the users according to the face recognition algorithm;

storing the face feature sets of the users in the archive, wherein the face feature sets of the users correspond to accounts of the users.

In one embodiment, the step of acquiring the face feature set of the user from the face image according to the face recognition algorithm, includes:

processing the face image to obtain a processed face image;

performing face feature recognition on the processed face image to obtain face features of the user;

filtering the face features of the user to obtain the face feature set of the user, wherein the face feature set of the user at least includes facial features and facial contour features of the user.

In one embodiment, the step of processing the face image to obtain the processed face image includes:

converting an acquired face image from an analog signal to a digital signal to obtain a first image;

performing a binarization process on the first image to obtain a second image;

performing a smoothing process on the second image to obtain a third image;

transforming the third image to obtain the processed face image, wherein transformation is used to correct systematic errors in the third image.

In one embodiment, the step of displaying the first video recommendation set if the face feature set of the at least one user matches the face feature sets in the archive includes:

displaying the first video recommendation set if a degree of matching between the face feature set of the at least one user and the face feature sets in the archive is greater than or equal to a threshold value.

In one embodiment, the step of displaying the second video recommendation set if each face feature set does not match the face feature sets in the archive, further includes:

displaying the second video recommendation set if a degree of matching between the face feature set of the at least one user and the face feature sets in the archive is less than a threshold value.

In one embodiment, the first video recommendation set includes a first video recommendation subset and a second video recommendation subset; the step of displaying the first video recommendation set if the face feature set of the at least one user matches the face feature sets in the archive, further includes:

if among the face feature set of the at least one user, a face feature set of only one user matches the face feature sets in the archive, displaying the first video recommendation subset corresponding to the only one user; and if among the face feature set of the at least one user, face feature sets of multiple users match the face feature sets in the archive, displaying the second video recommendation subset corresponding to the face feature sets of the multiple users.

In one embodiment, the first video recommendation subset corresponding to the only one user is a user favorite video set corresponding to the only one user.

In one embodiment, the second video recommendation subset corresponding to the face feature sets of the multiple users is an intersection of multiple user favorite video sets corresponding to the multiple users.

In one embodiment, the second video recommendation set is a public favorite video set.

In one embodiment, before the step of acquiring the face image, the method further includes:

determining the user favorite video set based on a view history in a user account.

In one embodiment, after the step of displaying the second video recommendation set if each face feature set does not match the face feature sets in the archive, the method further includes:

creating an account for the at least one user;

storing the face feature set of the at least one user to the archive, the face feature set of the at least one user associated with the account of the at least one user.

In a second aspect, an embodiment of the present disclosure provides a face recognition-based video recommendation apparatus, the apparatus includes:

a first acquiring module configured to acquire a face image, the face image including a face of at least one user;

a second acquiring module configured to acquire a face feature set of the user from the face image according to a face recognition algorithm;

a comparing module configured to compare the face feature set with face feature sets in an archive; and a video recommending module configured to display a first video recommendation set if a face feature set of at least one user matches the face feature sets in the archive, and to display a second video recommendation set if each face feature set does not match the face feature sets in the archive.

In a third aspect, an embodiment of the present disclosure provides a television, including a memory and a processor, the memory stores a computer program, and the processor implements the following steps when executing the computer program:

acquiring a face image, the face image including a face of at least one user;

acquiring a face feature set of the user from the face image according to a face recognition algorithm;

comparing the face feature set with face feature sets in an archive;

displaying a first video recommendation set if a face feature set of at least one user matches the face feature sets in the archive, and displaying a second video recommendation set if each face feature set does not match the face feature sets in the archive.

In a fourth aspect, an embodiment of the present disclosure further provides a computer-readable storage medium on which a computer program is stored, and when the computer program is executed by a processor, the following steps are implemented:

acquiring a face image, the face image including a face of at least one user;

acquiring a face feature set of the user from the face image according to a face recognition algorithm;

comparing the face feature set with face feature sets in an archive;

displaying a first video recommendation set if a face feature set of at least one user matches the face feature sets in the archive, and displaying a second video recommendation set if each face feature set does not match the face feature sets in the archive.

Compared with the prior art, the embodiments of the present disclosure have the following advantages:

according to the method provided by the embodiments of the present disclosure, a face image is acquired first, the face image including a face of at least one user; and then a face feature set of the user is obtained from the face image according to a face recognition algorithm; finally, the face feature set is compared with face feature sets in an archive; if a face feature set of at least one user matches the face feature sets in the archive, a first video recommendation set is displayed; if each face feature set does not match the face feature sets in the archive, a second video recommendation set is displayed. Using the method to recommend video to users reduces the operation steps of users choosing to watch videos and provides convenience for users to use.

BRIEF DESCRIPTION OF DRAWINGS

To illustrate the embodiments of the present disclosure or the technical solutions in the prior art clearly, appended drawings required in the descriptions of the embodiments and the prior arts are briefly described as follows. Obviously, the following drawings merely illustrate some embodiments of the present disclosure. For those skilled in the art, other drawings may be acquired according to the drawings without devoting effort.

DETAILED DESCRIPTION

To make those skilled in the art better understand the solutions of the present disclosure, the technical solutions in the embodiments of the present disclosure will be clearly and completely described below with reference to the accompanying drawings in the embodiments of the present disclosure. Obviously, the described embodiments are some of the embodiments of the present disclosure rather than all of the embodiments. All other embodiments obtained by a person skilled in the art based on the embodiments of the present disclosure without creative efforts shall fall within the protection scope of the present disclosure.

After research, it is found that in related technologies, when television recommends videos for users, the users need to log in their accounts on the television before they get recommended content, which is a complicated operation process and is not a good experience for the users.

To solve the above problem, in the embodiment of the present disclosure, the television can acquire an image of a user through a camera, and then recognize the user based on the acquired face image, and combine with the big data to recommend to the user a video that the user may like according to the result of the recognition. Through a video recommendation method in the embodiment of the present disclosure, the smart television shows the user's favorite content through recommendation, and the user can easily find the video he or she wants to watch, improving the user experience, reducing the user's operation process, and more accurately recommending content for the user, which provides convenience for the user to use. At the same time, an intelligent recommendation provides real-time and accurate recommendation service for different scenarios through in-depth mining of user behavior and business features, which quickly improves user activity and click conversion rate.

Various non-limiting embodiments of the present disclosure will be described in detail below with reference to the accompanying drawings.

Figure 1:
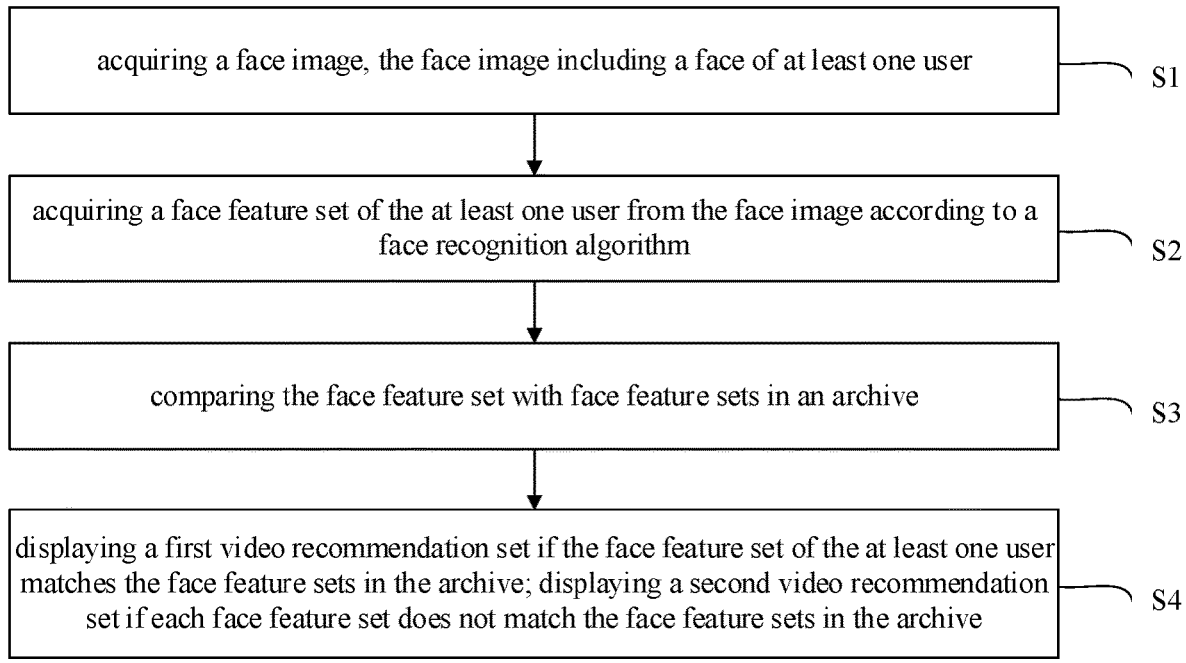
FIG. 1 is a schematic flowchart of a face recognition-based video recommendation method in an embodiment of the present disclosure.

An embodiment of the present disclosure provides a face recognition-based video recommendation method, as shown in FIG. 1, the method includes:

S1: acquiring a face image, the face image including a face of at least one user.

In the embodiment of the present disclosure, the face image or a video stream of a user may be acquired through a camera on a smart television. Wherein there may be multiple users watching the smart television, so there may be multiple users in the face image.

In an optional manner of an embodiment of the present disclosure, before starting to use a video recommendation function in the present disclosure, it is necessary to establish an archive in advance, i.e., before step S1, the method includes:

S0: establishing the archive in advance.

In the embodiment of the present disclosure, a face feature set of a user is acquired and stored in the archive. Specifically, a process of establishing the archive, i.e., step S0 includes:

S01: acquiring face images of users.

In the embodiment of the present disclosure, the face image or video stream is captured through the camera on the smart television, and further, the face images of the users are obtained based on the video stream captured by the camera.

S02: obtaining face feature sets of the users from the face images of the users.

In the embodiment of the present disclosure, based on a face recognition algorithm, multiple face features are obtained from the face images of the users, and then facial features and facial contour features of the users are selected from the obtained multiple face features to form face feature sets.

S03: storing the face feature sets of the users in the archive, wherein the face feature sets of the users correspond to accounts of the users.

In the embodiment of the present disclosure, the face feature sets and the features in the face feature sets are stored in the archive by means of binary fields. The archive is stored on cloud servers.

For example, before a user Liu uses a video recommendation function of the smart television, the archive of persons using the smart television, the face feature sets of Liu and Wang, Liu's wife, is established in advance. Specifically, face images of Liu and Wang respectively are acquired, and the face feature sets of Liu and Wang respectively are obtained from the face images of Liu and Wang according to the face recognition algorithm, and then the face feature sets of Liu and Wang respectively are stored in the archive, wherein the face feature set of Liu corresponds to an account of Liu, and the face feature set of Wang corresponds to an account of Wang. Through the above steps, the user can be identified and automatically logged in when the user uses the smart television, and then a user's favorite type of video can be recommended for the user subsequently.

S2: acquiring the face feature set of the user from the face image according to the face recognition algorithm.

In the embodiment of the present disclosure, the face feature set is acquired from the face image by the face recognition algorithm, and face recognition is a biometric recognition technology for performing identity recognition based on a face feature information of a person. A series of related technologies for capturing face images or video streams with a video camera or a camera and automatically detecting and tracking face features in the face images, and then performing the face recognition on detected faces, are also called portrait recognition, facial recognition, etc. When there are multiple face images, the face feature set corresponding to each of the multiple face images is obtained by a face recognition algorithm.

In an optional manner of the embodiment of the present disclosure, step S2 includes:

S21: processing the face image to obtain a processed face image.

In the embodiment of the present disclosure, that processing the face image includes performing analog-to-digital conversion, binarization processing, and smoothing processing on the face image.

Specifically, step S21 includes:

S211: converting an acquired face image from an analog signal to a digital signal to obtain a first image.

In the embodiment of the present disclosure, the face image is pre-processed, and the analog signal received by the camera is converted into a digital signal by means of an A/D converter.

S212: performing the binarization process on the first image to obtain a second image.

In the embodiment of the present disclosure, a gray value of pixel points of the image is set to 0 or 255, which is a process of rendering a whole image with a distinct black and white effect.

S213: performing a smoothing process on the second image to obtain a third image.

In the embodiment of the present disclosure, certain areas of excessive brightness variation or some bright spots (also called noise) may appear on a remote sensing image due to factors such as sensors and atmosphere. A processing method to suppress the noise and level out image brightness is image smoothing. Image smoothing is actually low-pass filtering, and the smoothing process causes blurring of image edges. In order to suppress the noise of a target image under a condition that image detail features are retained as much as possible, the noise is reduced by filtering.

S214: transforming the third image to obtain the processed face image, wherein transformation is used to correct systematic errors in the third image.

In the embodiment of the present disclosure, transforming of the third image in step S214 includes: at least translating, transposing, mirroring, rotating, scaling the third image, and processing the third image by geometric transformations such as translating, transposing, mirroring, rotating, scaling, etc., for correcting the systematic errors of an image acquisition system and random errors in a position of an instrument (imaging angles, perspective relationship, and even a lens itself).

By processing the acquired face image as described above, irrelevant information in the acquired face image is eliminated, useful and real information in the acquired face image is highlighted, and the processed face image facilitates the face recognition of the user in subsequent steps with better recognition results.

In the embodiment of the present disclosure, the face recognition algorithm is used to identify and extract face feature points to obtain the face feature set of the user. For example, an open source OpenCV algorithm is used to extract feature points of a face. First, use a facial detector of OpenCV to detect the face, and landmarks of the face may be obtained, that is, position points of eyes, a nose and a mouth may be obtained. Relationship between these landmarks and combinations thereof is the feature points of the face.

In the embodiment of the present disclosure, a process of the face recognition algorithm may include: 1. using OpenCV's Haar facial detector or lbp facial detector to detect faces in the acquired face image; 2. creating objects of a Facemark class, which in OpenCV is using a smart pointer (PTR); 3. loading landmark detector (lbfmodel.yaml), this facial detector is trained on thousands of face images with landmark labels and obtained; 4. running the facial detector on the acquired face image, an output of the facial detector is a vector containing one or more rectangles, i.e., there may be one or more faces in the face image; 5. capturing a face ROI of an original image according to a face rectangular box, and then using a facial landmark detector to detect the face ROI, for each face, multiple landmarks can be obtained and stored in the set; 6. according to the obtained landmarks, we can draw them on the face image and display them.

S22: performing face feature recognition on the processed face image to obtain the face features of the user.

For example, while Liu and his wife Wang are watching television together, the camera of the television captures the face images. The face images are processed to obtain processed face images, and then face recognition is performed on the processed face images to obtain the face features of two users, Liu and Wang.

S23: filtering the face features of the user to obtain the face feature set of the user, wherein the face feature set of the user at least includes facial features and facial contour features of the user.

In the embodiment of the present disclosure, if there are multiple user faces in the face image, face feature sets of multiple users are obtained.

For example, 4096 pixel point data can be obtained in a 64×64 image, and points on the image are divided into different subsets that often belong to isolated points, continuous curves, or continuous regions. A position of a user's mole may be used as a feature, sizes of the eyes may be used as a feature, a position of the eyes relative to the nose may be used as a feature, a shape of the mouth may also be used as a feature, and so on. The more features, the higher accuracy of the recognition.

S3: comparing the face feature set with face feature sets in the archive.

In the embodiment of the present disclosure, the face feature sets of multiple users are stored in the archive in advance, and the face feature set of each of the multiple users is compared with the face feature sets in the archive. During comparison, a degree of matching between each face feature set and the face feature set of each user pre-stored in the archive is determined. Each degree of matching is compared with a threshold value. If each degree of matching is less than the threshold value, it is determined that each face feature set does not match the face feature sets in the archive. If the degree of matching in each degree of matching is greater than or equal to the threshold value, it is determined that a face feature set of at least one user matches the face feature sets in the archive.

In a case of only one user, if the degree of matching between the face feature set of the user and the face feature sets in the archive is greater than or equal to the threshold value, the comparison succeeds and the face feature set of the user matches the face feature sets in the archive; if the degree of matching between the face feature set of the user and the face feature sets in the archive is less than the threshold value, the comparison fails and the face feature set of the user does not match the face feature sets in the archive. In a case of multiple users, if the degree of matching between a face feature set of one user and the face feature sets in the archive is greater than or equal to the threshold value, the comparison succeeds; if the degree of matching between face feature sets of all users and the face feature sets in the archive is less than the threshold value, the comparison fails.

For example, the face feature set of the user obtained from the face image includes: a1 and a2, and the face feature sets of multiple users pre-stored in the archive include b1 and b2. During the comparison, the degree of matching between a1 and b1 is determined, the degree of matching between a1 and b2 is determined, the degree of matching between a2 and b1 is determined, and the degree of matching between a2 and b2 is determined.

S4: displaying a first video recommendation set if the face feature set of the at least one user matches the face feature sets in the archive and displaying a second video recommendation set if each face feature set does not match the face feature sets in the archive.

In the embodiment of the present disclosure, the first video recommendation set is a user favorite video set, and the second video recommendation set is a public favorite video set.

Specifically, step S4 includes:

S41: displaying the first video recommendation set if the degree of matching between the face feature set of the at least one user and the face feature sets in the archive is greater than or equal to the threshold value.

S42: displaying the second video recommendation set if the degree of matching between the face feature set of the at least one user and the face feature sets in the archive is less than the threshold value.

In the present disclosure, the displayed video recommendation set is determined according to the degree of matching between the face feature set of the at least one user and the face feature sets in the archive. If the face feature set of the at least one user is a1, the pre-stored face feature sets of multiple users include b1 and b2, if the degree of matching between a1 and b1 is greater than the threshold value, the first video recommendation set corresponding to b1 is played; if the degree of matching between a1 and b1 is less than the threshold value, and the degree of matching between a1 and b2 is also less than the threshold value, the second video recommendation set is displayed.

In an optional manner of an embodiment of the present disclosure, the first video recommendation set includes a first video recommendation subset and a second video recommendation subset. The step of displaying the first video recommendation set if the face feature set of the at least one user matches the face feature sets in the archive includes:

if among the face feature set of the at least one user, a face feature set of only one user matches the face feature sets in the archive, displaying the first video recommendation subset;

if among the face feature set of the at least one user, face feature sets of multiple users match the face feature sets in the archive, displaying the second video recommendation subset.

In the embodiment of the present disclosure, the first video recommendation subset corresponding to the user is a user favorite video set corresponding to the user and an intersection of multiple user favorite video sets corresponding to the multiple users. If the acquired user faces are multiple and there are multiple face feature sets matching the face features in the archive, the second video recommendation subset is displayed.

In the embodiment of the present disclosure, if a face feature set of one user matches the face feature sets in the archive, the first video recommendation subset is displayed, wherein the first video recommendation subset is the user favorite video set. If the face feature sets of the multiple users match the face feature sets in the archive, the second video recommendation subset is displayed, wherein the second video recommendation subset is the intersection of multiple user favorite video sets.

In the embodiment of the present disclosure, before the step of acquiring the face image, the method further includes determining the user favorite video set based on a view history in a user account. Specifically, the user favorite video set is determined based on the viewing history in the user account, in combination with a big data algorithm.

After the step of displaying the second video recommendation set if each face feature set does not match the face feature sets in the archive, the method further includes: creating an account for the at least one user; storing the face feature set of the at least one user to the archive, the face feature set of the at least one user associated with the account of the at least one user. Thus, during a next use of the at least one user, the face recognition- based video recommendation method provided in the present disclosure may display the first video recommendation set for the at least one user.

Through a video recommendation method in the embodiment of the present disclosure, the television shows user's favorite content through intelligent recommendation, and the user can easily find the video he or she wants to watch, improving the user experiences, reducing the operation process for the user, and more accurately recommending content for the user, which provides convenience for the user to use. At a same time, the intelligent recommendation provides real-time and accurate recommendation service for different scenarios through in-depth mining of the user behavior and the business features, which quickly improves the user activity and the click conversion rate.

Figure 2:
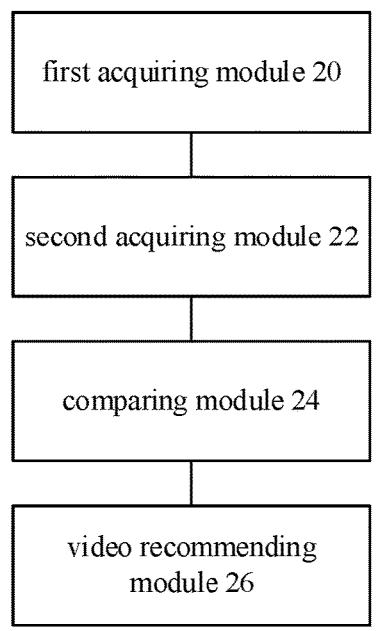
FIG. 2 is a schematic structural diagram of a face recognition-based video recommendation apparatus in an embodiment of the present disclosure.

An embodiment of the present disclosure provides a face recognition-based video recommendation apparatus, as shown in FIG. 2, and the apparatus includes:

a first acquiring module 20 configured to acquire a face image, the face image including a face of at least one user;

a second acquiring module 22 configured to acquire a face feature set of the user from the face image according to a face recognition algorithm;

a comparing module 24 configured to compare the face feature set with face feature sets in an archive; and a video recommending module 26 configured to display a first video recommendation set if a face feature set of at least one user matches the face feature sets in the archive, and to display a second video recommendation set if each face feature set does not match the face feature sets in the archive.

Through the video recommendation method in the embodiment of present disclosure, the television shows user's favorite content through intelligent recommendation, and the user can easily find the video he or she wants to watch, improving the user experiences, reducing the operation process for the user, and more accurately recommending content for the user, which provides convenience for the user to use. At a same time, the intelligent recommendation provides real-time and accurate recommendation service for different scenarios through in-depth mining of the user behavior and the business features, which quickly improves the user activity and the click conversion rate.

Figure 3:
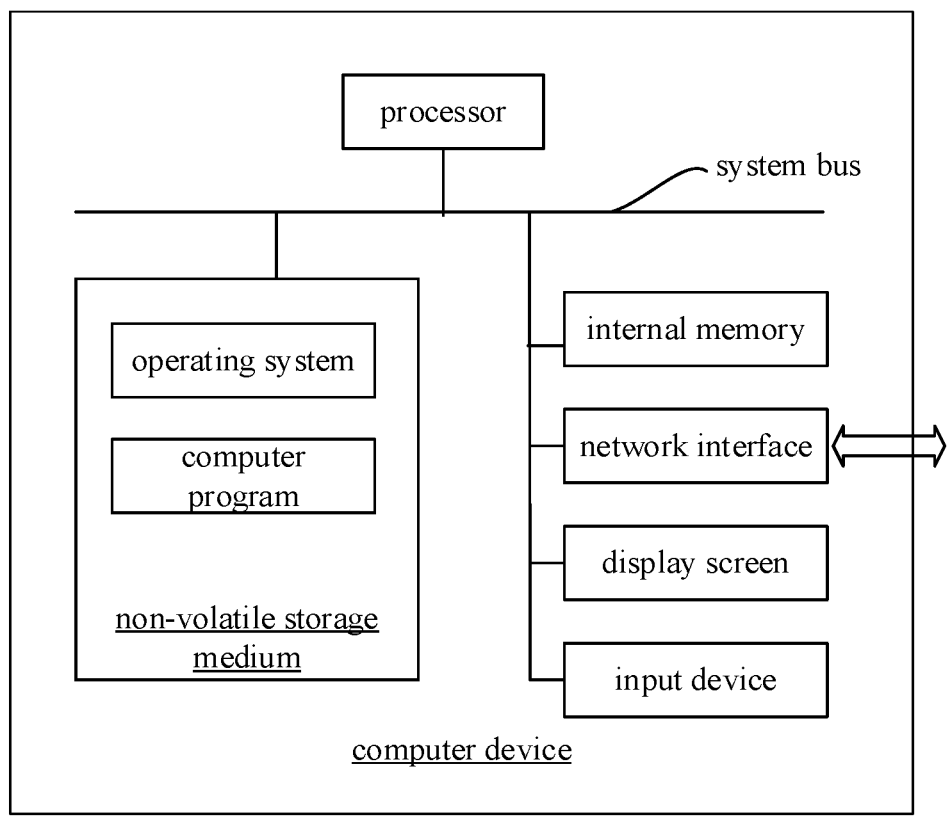
FIG. 3 is an internal structural diagram of a computer device in an embodiment of the present disclosure.

In one embodiment, the present disclosure provides a computer device, which may be a terminal with an internal structure as shown in FIG. 3. The computer device includes a processor, a memory, a network interface, a display screen, and an input device coupled via a system bus. Wherein, the processor of the computer device is configured to provide computing and control capabilities. The memory of the computer device includes a non-volatile storage medium and an internal memory. The non-volatile storage medium stores an operating system and a computer program. The internal memory provides an environment for implementation of the operating system and the computer program in the non-volatile storage medium. The network interface of the computer device is used to communicate with an external terminal via a network connection. The computer program is executed by the processor in order to implement a method of generating a natural language model. The display screen of the computer device may be a liquid crystal display screen or an electronic ink display screen, and the input device of the computer device may be a touch layer covered on the display screen, or may also be a button, a trackball or a trackpad arranged on a housing of the computer device, or may further be an external keyboard, a trackpad, or a mouse, etc.

It should be understood by those skilled in the art that the structure illustrated in FIG. 3 is only a block diagram of a part of a structure related to solutions of the present disclosure and does not constitute a limitation to the computer device to which the solution of the present disclosure is applied. A specific computer device may include more or less components than those illustrated in FIG. 3, or combinations of certain components, or have a different arrangement of the components.

An embodiment of the present disclosure provides a computer device comprising a memory and a processor, the memory storing a computer program, and the processor implementing the following steps when executing the computer program:

acquiring a face image, the face image including a face of at least one user;

acquiring a face feature set of the at least one user from the face image according to a face recognition algorithm;

comparing the face feature set with face feature sets in an archive;

displaying a first video recommendation set if the face feature set of the at least one user matches the face feature sets in the archive, and displaying a second video recommendation set if each face feature set does not match the face feature sets in the archive.

An embodiment of the present disclosure further provides a computer-readable storage medium having a computer program stored thereon, and the computer program when executed by a processor implements following steps:

acquiring a face image, the face image comprising a face of at least one user;

acquiring a face feature set of the at least one user from the face image according to a face recognition algorithm;

comparing the face feature set with face feature sets in an archive;

displaying a first video recommendation set if the face feature set of the at least one user matches the face feature sets in the archive, and displaying a second video recommendation set if each face feature set does not match the face feature sets in the archive.

The technical features of the above-mentioned implementations may be combined in any combination. For brevity of description, not all possible combinations of the technical features in the above implementations are described. However, as long as there is no contradiction in combination of these technical features, it should be considered as the scope of the present specification.

The implementations described above merely provide several implementations of the present disclosure, and their descriptions are relatively specific and detailed, but they are not to be construed as limiting the protection scope of the present disclosure. It should be noted that for those of ordinary skill in the art, variations and improvements may be made without departing from the concept of the present disclosure, which fall within the protection scope of the present disclosure. The protection scope of the present disclosure is defined by the appended claims.

What is claimed is:

1. A face recognition-based video recommendation method, the method comprising:
    acquiring a face image, the face image comprising a face of at least one user;
    acquiring a face feature set of the at least one user from the face image according to a face recognition algorithm;
    comparing the face feature set with face feature sets in an archive;
    displaying a first video recommendation set if the face feature set of the at least one user matches the face feature sets in the archive, and
    displaying a second video recommendation set if each face feature set does not match the face feature sets in the archive;
    wherein the first video recommendation set includes a first video recommendation subset and a second video recommendation subset; displaying the first video recommendation set if the face feature set of the at least one user matches the face feature sets in the archive comprises:
    if among the face feature set of the at least one user, a face feature set of only one user matches the face feature sets in the archive, displaying the first video recommendation subset corresponding to the only one user; and
    if among the face feature set of the at least one user, face feature sets of multiple users match the face feature sets in the archive, displaying the second video recommendation subset corresponding to the face feature sets of the multiple users;
    wherein a process of the face recognition algorithm comprises:
    using a facial detector to detect faces in an acquired face image;
    creating objects of a Facemark class, loading a facial landmark detector, wherein the facial landmark detector is trained on thousands of face images with landmark labels and obtained;
    running the facial detector on the acquired face image, wherein an output of the facial detector is a vector containing one or more rectangles, and the face image comprises one or more faces;
    capturing a face ROI of an original image according to a face rectangular box, and then using the facial landmark detector to detect the face ROI, for each face, multiple landmarks are obtained and stored; and
    according to the landmarks, drawing the landmarks on the face image and display the landmarks;
    wherein if the face feature set of the at least one user is a1, pre-stored face feature sets of multiple users comprise b1 and b2, if a degree of matching between a1 and b1 is greater than a threshold value, the first video recommendation set corresponding to b1 is played; if the degree of matching between a1 and b1 is less than the threshold value, and the degree of matching between a1 and b2 is also less than the threshold value, the second video recommendation set is displayed;
    wherein after displaying the second video recommendation set, an account is created for a user whose face feature set does not match any in the archive, and the user's face feature set is associated with the account and stored in the archive;
    wherein before acquiring the face image, the method further comprises determining a user favorite video set based on a view history in a user account using a big data algorithm.

2. The face recognition-based video recommendation method as claimed in claim 1, wherein before acquiring the face image, the method further comprises: establishing the archive in advance.

3. The face recognition-based video recommendation method as claimed in claim 2, wherein establishing the archive in advance further comprises:
    acquiring face images of users;
    obtaining face feature sets of the users from the face images of the users according to the face recognition algorithm; and
    storing the face feature sets of the users in the archive, wherein the face feature sets of the users correspond to accounts of the users.

4. The face recognition-based video recommendation method as claimed in claim 1, wherein acquiring the face feature set of the user from the face image according to the face recognition algorithm further comprises:
    processing the face image to obtain a processed face image;
    performing face feature recognition on the processed face image to obtain face features of the user; and
    filtering the face features of the user to obtain the face feature set of the user, wherein the face feature set of the user at least includes facial features and facial contour features of the user.

5. The face recognition-based video recommendation method as claimed in claim 4, wherein processing the face image to obtain the processed face image comprises:
    converting an acquired face image from an analog signal to a digital signal to obtain a first image;
    performing a binarization process on the first image to obtain a second image;
    performing a smoothing process on the second image to obtain a third image; and
    transforming the third image to obtain the processed face image, wherein transformation is used to correct systematic errors in the third image.

6. The face recognition-based video recommendation method as claimed in claim 1, wherein displaying the first video recommendation set if the face feature set of the at least one user matches the face feature sets in the archive comprises:
    displaying the first video recommendation set if a degree of matching between the face feature set of the at least one user and the face feature sets in the archive is greater than or equal to a threshold value.

7. The face recognition-based video recommendation method as claimed in claim 1, wherein displaying the second video recommendation set if each face feature set does not match the face feature sets in the archive comprises:
    displaying the second video recommendation set if a degree of matching between the face feature set of the at least one user and the face feature sets in the archive is less than a threshold value.

8. The face recognition-based video recommendation method as claimed in claim 1, wherein the first video recommendation subset corresponding to the only one user is a user favorite video set corresponding to the only one user.

9. The face recognition-based video recommendation method as claimed in claim 1, wherein the second video recommendation subset corresponding to the face feature sets of the multiple users is an intersection of multiple user favorite video sets corresponding to the multiple users.

10. The face recognition-based video recommendation method as claimed in claim 1, wherein the second video recommendation set is a public favorite video set.

11. The face recognition-based video recommendation method as claimed in claim 1, wherein after displaying the second video recommendation set if each face feature set does not match the face feature sets in the archive, the method further comprises:
 creating an account for the at least one user; and
 storing the face feature set of the at least one user to the archive, the face feature set of the at least one user associated with the account of the at least one user.

12. A television, the television comprising: a memory and a processor, the memory storing a computer program, wherein the processor implements the method as claimed in claim 1 when executing the computer program.

13. A non-transitory computer-readable storage medium, on which a computer program is stored, and when the computer program is executed by a processor, the method as claimed in claim 1 are implemented.

\* \* \* \* \*